US 008840066B2

(12) United States Patent
Loupias et al.

(10) Patent No.: US 8,840,066 B2
(45) Date of Patent: Sep. 23, 2014

(54) FRONT PART OF AN AIRCRAFT FUSELAGE INCORPORATING A BAY FOR STOWING LANDING GEAR

(75) Inventors: Thierry Loupias, Blagnac (FR); Patrick Gouarderes, Aussonne (FR)

(73) Assignee: AIRBUS Operations S.A.S., Toulouse (FR)

(*) Notice: Subject to any disclaimer, the term of this patent is extended or adjusted under 35 U.S.C. 154(b) by 300 days.

(21) Appl. No.: 13/315,903

(22) Filed: Dec. 9, 2011

(65) Prior Publication Data

US 2012/0153078 A1 Jun. 21, 2012

(30) Foreign Application Priority Data

Dec. 17, 2010 (FR) ...................................... 10 04923

(51) Int. Cl.
B64C 1/00 (2006.01)
B64C 25/14 (2006.01)
B64C 1/06 (2006.01)
B64C 25/16 (2006.01)

(52) U.S. Cl.
CPC ................. B64C 1/068 (2013.01); B64C 25/14 (2013.01); B64C 25/16 (2013.01)
USPC ....................... 244/119; 244/102 R

(58) Field of Classification Search
USPC ............ 244/119, 102 R, 100 R, 102 A, 129.4
See application file for complete search history.

(56) References Cited

U.S. PATENT DOCUMENTS

| 5,482,228 A * | 1/1996 | Hoshino ......................... 244/50 |
| 6,213,428 B1 * | 4/2001 | Chaumel et al. .............. 244/119 |
| 7,784,736 B2 * | 8/2010 | Guering et al. ............... 244/119 |
| 2009/0078823 A1 * | 3/2009 | Wood et al. .................. 244/119 |
| 2010/0032521 A1 | 2/2010 | De Ruffray et al. |

FOREIGN PATENT DOCUMENTS

GB 620863 3/1949
WO WO 2007/057400 A1 5/2007

OTHER PUBLICATIONS

French Preliminary Search Report and Written Opinion issued Jul. 15, 2011, in French 1004923, filed Dec. 17, 2010 (with English Translation of Categories of Cited Documents).

* cited by examiner

Primary Examiner — J. Woodrow Eldred
(74) Attorney, Agent, or Firm — Oblon, Spivak, McClelland, Maier & Neustadt, L.L.P.

(57) ABSTRACT

A front part of an aircraft fuselage according to this invention comprises:
  frames (16) disposed transversely in relation to a longitudinal axis of the aircraft,
  an outer skin (14) fastened onto the frames (16),
  a landing-gear (2) stowage compartment comprising among other things longitudinal side walls (10) borne by frames (16),
  a panel (26) between each longitudinal side wall (10) and the outer skin (14) achieving sealing between the interior and the exterior of the aircraft.

10 Claims, 3 Drawing Sheets

Figure 6:
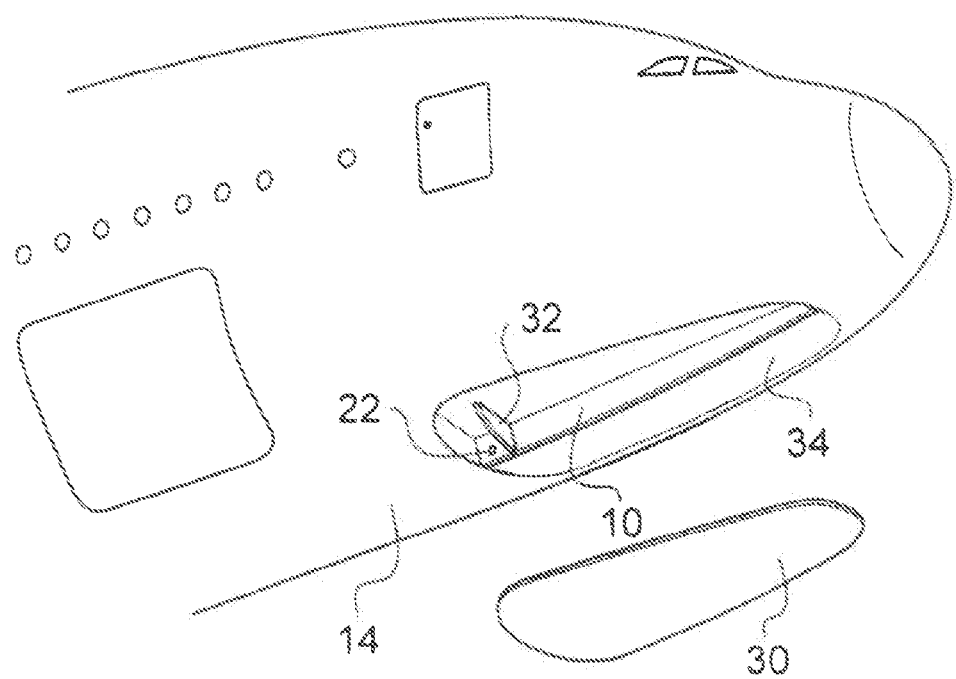

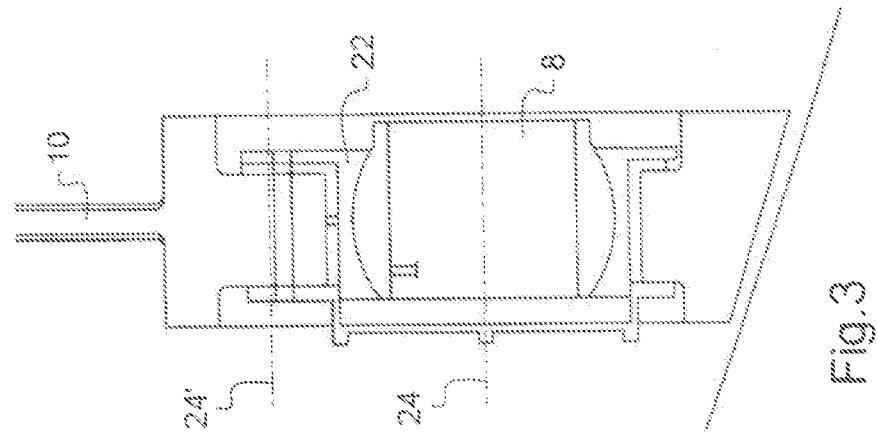
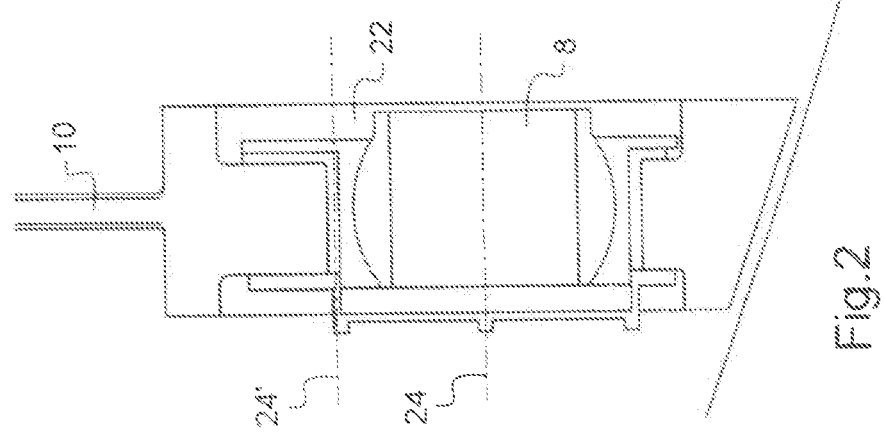
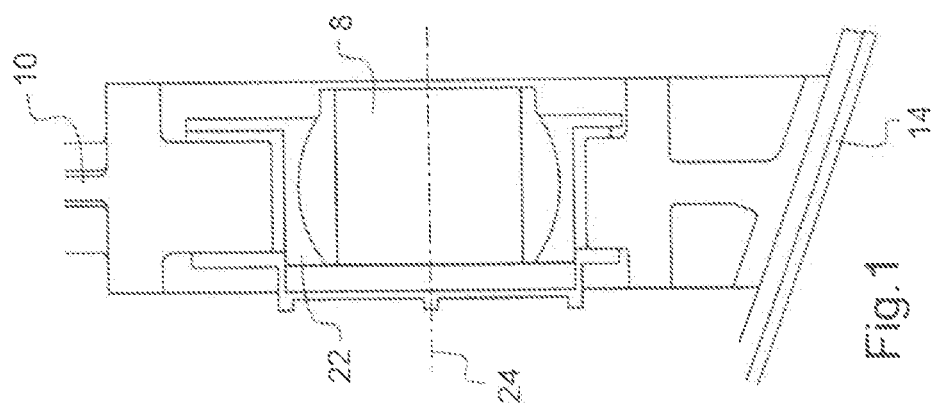

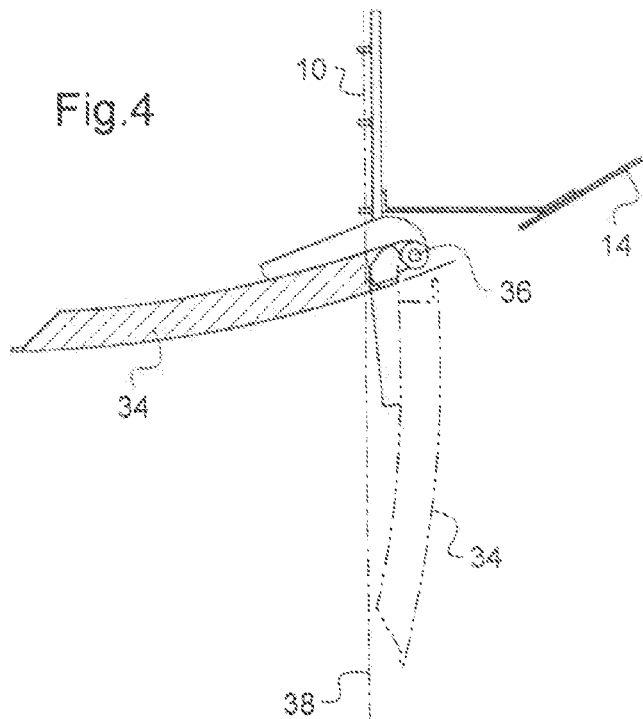
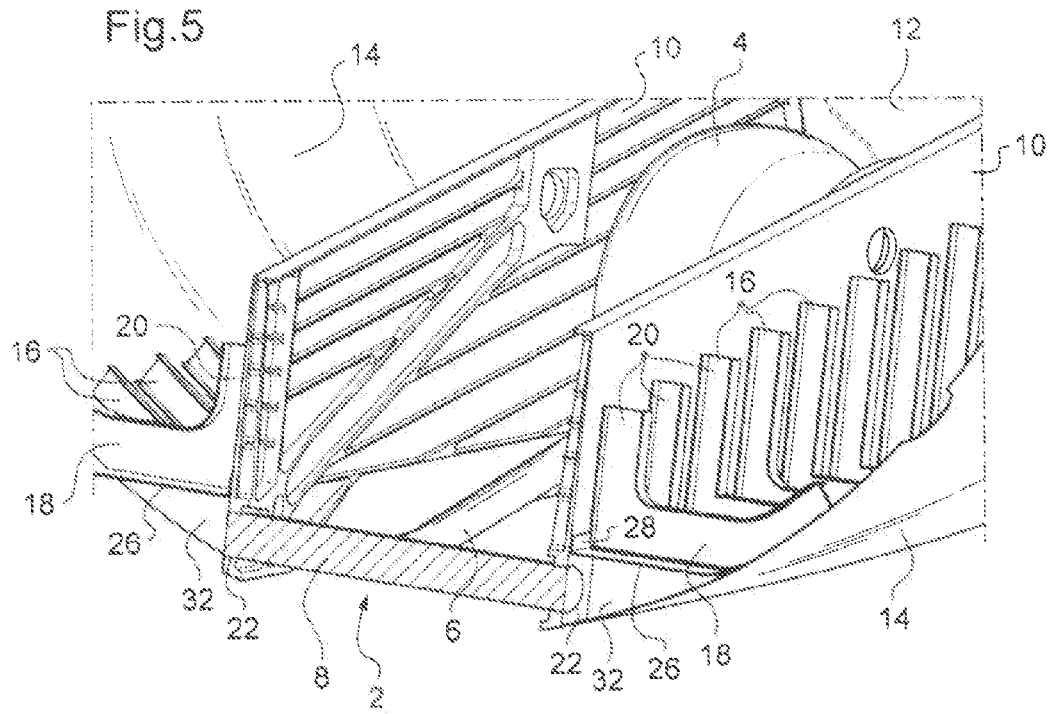

FRONT PART OF AN AIRCRAFT FUSELAGE INCORPORATING A BAY FOR STOWING LANDING GEAR

This invention relates to the front part of an aircraft fuselage comprising a stowage compartment for a landing gear.

In standard manner, an aircraft comprises a nose landing gear that comes to be accommodated, in flight, in a box, also called compartment, situated in the front part of the fuselage of the aircraft, generally underneath the floor of the cockpit of the aircraft.

A stowage compartment for a landing gear forms the interface between the pressurized interior of the aircraft and the non-pressurized exterior of this aircraft. The nose landing gear, in a retracted position, comes to be placed inside the landing-gear stowage compartment. In this position, a door, generally comprising two flaps, comes to close the landing-gear stowage compartment and ensures the continuity of the shape of the fuselage of the aircraft. The landing gear is outside its stowage compartment when the aircraft is on the ground or also at the end of the landing phase and at the start of the takeoff phase.

As indicated, the landing-gear stowage compartment has an overall parallelepipedal shape. The lower face of this compartment is open and a door, with possibly several flaps, is provided in order to close this lower face when the landing gear is in retracted position and is accommodated in its stowage compartment. In the embodiments of the known prior art, the outer skin of the fuselage of the aircraft is fastened onto the periphery of the opening of the stowage compartment for the landing gear. Uniformly distributed fastenings thus are provided at the bottom of the side walls—more or less vertical—of the stowage compartment for the landing gear in order to implement the connection between the outer skin of the fuselage and the landing-gear stowage compartment. In this way a sealing is implemented directly between the outer skin of the fuselage and the stowage compartment for the landing gear.

The problem underlying this invention is to reduce the size of the stowage compartment for a landing gear for a given fuselage shape, that is to say, while preserving the volume of the fuselage of the aircraft. The reduction of the size of the landing-gear stowage compartment is advantageous from several points of view. This reduced size makes it possible to increase the volume available inside the fuselage accordingly. Moreover, the reduction of the size of the stowage compartment should make it possible to bring about a reduction of the mass of the aircraft.

The purpose of this invention therefore is to provide means making it possible to reduce the size of a landing-gear stowage compartment in an aircraft.

To this end, this invention proposes a front part of an aircraft fuselage comprising:
  frames disposed transversely in relation to a longitudinal axis of the aircraft,
  an outer skin fastened onto the frames,
  a landing-gear stowage compartment comprising, among other things, longitudinal side walls borne by frames.

According to this invention, a panel between each longitudinal side wall and the outer skin achieves sealing between the interior and the exterior of the aircraft.

Whereas in the front fuselage parts of aircraft of the prior art the outer skin is directly fastened imperviously onto the lower edge of the side walls, this invention proposes, at the longitudinal side walls, to offset the fastening of the edge of an opening implemented in the outer skin of the fuselage in order to let a landing gear pass to the outside of the stowage compartment, a sealing panel then being used to connect the edge of the opening implemented in the outer skin to the stowage compartment, and more precisely to a longitudinal side wall thereof, so as to ensure a continuity of sealing between the—pressurized—interior and the exterior of the aircraft. In this way, it no longer is necessary to provide means for impervious fastening of the outer skin of the aircraft at the lower edge of the longitudinal side walls. This makes it possible to save space around the bottom of these longitudinal side walls and to bring down the landing gear accommodated in the stowage compartment accordingly. Since the landing gear is lower, it is appropriate to reduce its length, and thus the length (measured longitudinally) of the corresponding compartment itself also may be reduced accordingly.

According to one embodiment of the invention, the front part of an aircraft fuselage further comprises a landing gear installed pivoting between a first position in which the landing gear is accommodated inside the stowage compartment and a second position in which the landing gear is almost entirely outside the storage compartment, the landing gear being installed pivoting around a pick-up axis supported by two bearing surfaces integrated into the longitudinal side walls of the stowage compartment, and each of the panels achieving sealing then advantageously is fastened underneath a bearing surface of the pick-up axis. In this way the installation of the bearing surfaces of the pick-up axis do not come to interfere with the impervious connection between the stowage compartment and the sealing panels.

In one embodiment of this invention it is proposed that each panel achieving sealing between the outer skin and a longitudinal side wall be a more or less plane panel extending more or less perpendicular to the corresponding longitudinal side wall.

A front part of an aircraft fuselage according to this invention may further comprise a door making it possible to close the stowage compartment, the said door having two flaps pivoting around a longitudinal pivot axis, and each longitudinal pivot axis then advantageously is disposed outside the stowage compartment. In this way, it then is possible also to reduce the width (measured transversely) of the stowage compartment. As explained in greater detail in the description that follows, this reduction in width also makes it possible to bring about a reduction in length of the stowage compartment for the landing gear.

In this embodiment of a front part of an aircraft fuselage according to the invention, in which a door closes the stowage compartment, it also is possible to provide that a fairing comes to achieve a continuity of profile between the outer skin and the door of the stowage compartment. This fairing may be fastened onto reinforcement parts installed on frames situated at the stowage compartment, a sealing panel being located between the said frames and the corresponding reinforcement parts. Each longitudinal pivot axis of a pivoting flap then advantageously is accommodated in a space defined within a sealing panel, a longitudinal side wall and a fairing.

This invention also provides for a shape for the frames of the aircraft fuselage front part advantageous for this invention. According to this embodiment, each frame situated at the stowage compartment has a part in the shape of an arc of a circle over more than 180°, and each end of the part in the shape of an arc of a circle is extended by a bracket, a first branch of the bracket bearing a sealing panel and a second branch of the bracket bearing a longitudinal side wall of the stowage compartment.

Finally, this invention also relates to an aircraft, characterized in that it comprises a fuselage front part such as described above.

Details and advantages of this invention will become more apparent from the description that follows, presented with reference to the attached schematic drawings on which:

FIG. 1 is a view in cross section showing the lower part of a longitudinal side wall of a stowage compartment of the prior art, FIG. 2 is a view similar to that of FIG. 1 for a first embodiment variant of this invention, FIG. 3 is a view similar to FIGS. 1 and 2 for a second embodiment variant of this invention, FIG. 4 illustrates the installation of a closing-door flap for a stowage compartment for this invention, FIG. 5 is a perspective view of a gear stowage compartment according to this invention, and FIG. 6 is a partially exploded perspective view of an aircraft fuselage front part according to this invention.

FIG. 5 partially illustrates a stowage compartment for a nose landing gear 2 of an aircraft. The individual skilled in the art knows the usual structure of such a stowage compartment and such a landing gear. Therefore they will be only briefly described below.

As a preliminary, as regards the horizontal and vertical directions as well as the lower and upper directions, an aircraft set down on the ground is considered here. Moreover, in standard manner, an aircraft has a longitudinal axis more or less indicating its direction of movement. Thus, an object will be considered as extending longitudinally if it extends parallel to the longitudinal axis of the aircraft and will be considered as transverse if it extends transversely in relation to this longitudinal axis.

On FIG. 5, nose landing gear 2 is shown in its retracted position. This landing gear 2 comprises wheels 4 only one of which is clearly visible on FIG. 5. These wheels 4 are connected by an axle (not shown) which extends horizontally. This axle is borne by a leg 6 installed pivoting around an axis referred to as pick-up axis 8 of the landing gear. In the position shown on FIG. 5, leg 6 extends more or less longitudinally and horizontally. In its opened-out position, it extends vertically. As for pick-up axis 8, it is a horizontal and transverse pivot axis.

The stowage compartment for nose landing gear 2 is shown only partially on FIG. 5. Such a stowage compartment has, in standard manner, an overall parallelepipedal shape. Its function is to accommodate landing gear 2 and to achieve sealing between the exterior of the aircraft and the pressurized interior thereof. Considering its parallelepipedal shape, this stowage compartment thus has six faces. Its lower face is entirely open so as to define an opening via which landing gear 2, and in particular wheels 4 of this landing gear, may enter and leave the stowage compartment. It also comprises an upper face, opposite the open face. This upper face is not shown on FIG. 5 so as to better display the inside of the stowage compartment. The latter further comprises four side walls: two longitudinal side walls 10 and two transverse side walls 12. On FIG. 5, longitudinal side walls 10 are shown partially cut off at pick-up axis 8. Front transverse side wall 12 is partially visible, while the rear transverse side wall is not shown (just like the upper wall of the stowage compartment, so as to better display the inside of this stowage compartment).

This invention relates more particularly to longitudinal side walls 10 and the way in which they cooperate on the one hand with pick-up axis 8 and, on the other hand, with an outer fuselage skin 14.

In fact, in standard manner, the structure of an aircraft comprises frames that are disposed transversely and that bear an outer skin 14 and that form the outer surface of the aircraft. The frames are "beams" of overall ring shape. Outer skin 14 is fastened onto these frames.

At the stowage compartment, the frames are open as illustrated on FIG. 5. On this Figure, only the ends of frame 16 situated at the stowage compartment are shown. In their upper part, not shown, these frames 16 have a shape of an arc of a circle over more than 180°. Each of the ends of this arc of a circle bears a bracket that comes to cooperate with a longitudinal side wall 10 of the stowage compartment. Each of the brackets has a first horizontal branch 18 and a second vertical branch 20. Each second branch 20 serves for fastening a longitudinal side wall 10.

Pick-up axis 8 is a pivot axis installed on bearing surfaces 22. The latter are integrated into longitudinal side walls 10. This integration of bearing surfaces 22 into said longitudinal side walls 10 is already known from the prior art. FIG. 1 illustrates the integration of such a bearing surface 22 into such a longitudinal side wall 10 in the art prior to this invention. There is seen first of all on this FIG. 1 axis 24 which corresponds to the geometric pivot axis of pick-up axis 8. Bearing surface 22 is disposed at the bottom of longitudinal side wall 10 and it is seen that outer skin 14 is fastened onto the lower edge of this longitudinal side wall 10. This connection is implemented so as to guarantee sealing between the pressurized interior and the exterior of the aircraft.

FIG. 2 is a view similar to FIG. 1, but for this invention. In this embodiment, outer skin 14 no longer is fastened onto longitudinal side wall 10. The lower edge of this longitudinal side wall 10 then may be configured differently and bearing surface 22 of pick-up axis 8 may be lowered. Axis 24' which corresponds to the position of axis 24 in the prior state of the art has been shown on FIG. 2. It is seen here that axis 24 is underneath axis 24'. In practice, the distance between the two axes 24 and 24' is on the order of a few centimeters, for example 4 to 5 centimeters.

Since pick-up axis 8 is situated a few centimeters lower, the length of leg 6 may be reduced accordingly. Thus, the length (measured longitudinally) of the entire stowage compartment itself also may be reduced accordingly. Therefore, in this way, a first reduction in size of the stowage compartment for landing gear 2 thus is achieved. Since outer skin 14 no longer is fastened onto longitudinal side wall 10, it is quite appropriate to implement a continuity of sealing between the pressurized interior of the aircraft and the exterior thereof. It is proposed here, in this embodiment, to provide a sealing panel 26 in order to connect outer skin 14 to the stowage compartment. Nonetheless, unlike the embodiments of the prior art, sealing no longer is implemented at the lower edge of longitudinal side wall 10 of the stowage compartment but, in the preferred embodiment shown here, on the exterior face of longitudinal side wall 10 of the aircraft, above pick-up axis 8 or even bearing surface 22.

Sealing panel 26 is borne by first branch 18 of frames 16 situated at the stowage compartment for landing gear 2.

The individual skilled in the art knows how to implement an impervious connection between on the one hand outer skin 14 and sealing panel 26 and, on the other hand, between sealing panel 26 and longitudinal side wall 10. As illustrated on FIG. 5, by way of example, the connection between longitudinal side panel 10 and sealing panel 26 may be implemented with the aid of a connecting angle 28.

In standard manner, the stowage compartment is closed, at its open lower face, by a door having one or more flaps. In the embodiment shown on the drawings and in this description, the most frequent case is adopted, in which the door closing the stowage compartment for the landing gear comprises two flaps each pivoting around a more or less horizontal longitudinal axis (since the section of the fuselage is increasing at this level of the fuselage, the pivot axis of the flaps follows this increase in section and therefore is not precisely horizontal).

In order to ensure the continuity of the exterior shape of the aircraft, when the stowage compartment for landing gear 2 is closed, a fairing 30 is provided in order to implement the joining between outer skin 14 and the flaps of the door for closing the stowage compartment for the landing gear. A reinforcement part 32 is provided at each frame 16 situated at the stowage compartment in order to reinforce the structure of the aircraft. It allows reproduction of the shape of a frame of the prior art and contributes to the pick-up of the considerable stresses that are transmitted by the landing gear in particular during landing phases. Such a reinforcement part 32 also may be used for fastening fairing 30. This reinforcement part 32 is fastened onto first horizontal branch 18 of the corresponding bracket of frame 16. Such a reinforcement part 32 thus has a fastening face intended to enable fastening thereof onto a first branch 18 of a bracket of a frame 16 situated at the stowage compartment, a fastening face for fastening reinforcement part 32 onto the exterior face of the corresponding longitudinal side wall 10 as well as a support face for holding fairing 30.

It will be seen here that the edge of the opening implemented in outer skin 14 situated at the front and rear transverse side walls may come to be fastened directly onto the lower edge of said transverse side walls 12, as in the embodiments known from the prior art.

In order to enable a second reduction of the stowage compartment, it is proposed here to take advantage of the space situated between sealing panel 26 and fairing 30 for accommodating therein the pivot axis of the flaps of the door for closing the stowage compartment for landing gear 2. In the landing gears of the prior art, the pivot axes of these flaps generally are situated inside the stowage compartment. It is proposed here to take the pivot axes out of the stowage compartment by taking advantage of the space between sealing panel 26 and fairing 30. An installation such as proposed by this invention is illustrated on FIG. 4. On the latter, a flap 34 is installed pivoting around a pivot axis 36. Flap 34 is shown hatched in its closed position and non-hatched in its open position. Here advantage may be taken of the presence of reinforcement parts 32 also to support pivot axis 36 of flaps 34. Line 38 in a mixed line illustrates the edge of the space necessary for passage of wheels 4 during entry and exit of landing gear 2.

It will not be lost on the individual skilled in the art that the fact of taking pivot axis 36 of flaps 34 of the closing door out of the stowage compartment, first of all makes it possible to reduce the width of the stowage compartment, that is to say to reduce the distance separating the two longitudinal side walls 10. As a result of this narrowing of the width (measured transversely) of the stowage compartment, since the transverse sections of the fuselage are circular, the position of the lower edge of longitudinal side walls 10 also is changed. When the width of the stowage compartment for the landing gear is reduced, the lower edge of longitudinal side walls 10 comes down. In this way a downward movement of bearing surfaces 22 of pick-up axis 8 again is produced. This new position of bearing surfaces 22 is illustrated on FIG. 3. It may be considered here that the movement of bearing surfaces 22, and of the corresponding pick-up axis 8, also is on the order of a few centimeters, for example 2 to 3 centimeters. This makes it possible again to achieve a reduction in length of the stowage compartment for the landing gear, as explained above.

The invention such as described above thus makes it possible to define a nose landing-gear compartment smaller than the nose-gear compartments of the prior art while preserving a given fuselage shape and volume.

This invention here proposes to position the pick-up axis, or axis of rotation, of the landing gear as low as possible. In that way, by lowering the point of rotation, landing gear 2 may be reduced in size and as a result the stowage compartment intended to accommodate it may be reduced correspondingly.

It also has been seen above how, after a first lowering of the pick-up axis, it likewise is possible to reduce the width (measured transversely) of the stowage compartment for the landing gear and how this reduction in width makes it possible again to lower the position of the axis of rotation of the landing gear, in turn enabling a further reduction in length of the stowage compartment.

This invention is not limited to the preferred embodiment described above by way of non-limitative example and shown on the drawings. It also relates to all the embodiment variants within the capacity of the individual skilled in the art within the context of the claims below.

Thus, for example, the case in which the pivot axis of the flaps of the door for the landing gear was kept inside the said stowage compartment would not be a departure from the context of this invention.

The invention claimed is:

1. A front part of an aircraft fuselage comprising:
    frames disposed transversely in relation to a longitudinal axis of the aircraft,
    an outer skin fastened onto the frames,
    a landing gear stowage compartment including longitudinal side walls borne by the frames, and
    for each longitudinal side wall, a panel between the longitudinal side wall and the outer skin, each panel being fastened to the corresponding longitudinal side wall at a position above a bottom end of the corresponding longitudinal side wall, and each panel achieving sealing between a pressurized interior of the aircraft and an unpressurized space.

2. The front part of an aircraft fuselage according to claim 1, further comprising a landing gear installed pivoting between a first position in which the landing gear is accommodated inside the stowage compartment and a second position in which at least a portion of the landing gear is outside the stowage compartment, the landing gear is installed pivoting around a pick-up axis supported by two bearing surfaces integrated into the longitudinal side walls of the stowage compartment, and each panel achieves sealing and is fastened above a corresponding one of the bearing surfaces of the pick-up axis.

3. The front part of an aircraft fuselage according to claim 2, wherein each panel achieves sealing between the outer skin and the corresponding longitudinal side wall, and each panel is a plane panel extending perpendicular to the corresponding longitudinal side wall.

4. The front part of an aircraft fuselage according to claim 1, further comprising a door making it possible to close the stowage compartment, the door has two flaps pivoting around longitudinal pivot axes, and each longitudinal pivot axis is disposed outside the stowage compartment.

5. The front part of an aircraft fuselage according to claim 4, wherein a fairing is provided in order to achieve a continuity of profile between the outer skin and the door of the stowage compartment.

6. The front part of an aircraft fuselage according to claim 5, wherein the fairing is fastened onto reinforcement parts installed on the frames that are situated at the stowage compartment, and each sealing panel is located between the frames and a corresponding one of the reinforcement parts.

7. The front part of a fuselage according to claim 4, wherein each longitudinal pivot axis of a pivoting flap is accommodated in a space defined within one sealing panel, the corresponding longitudinal side wall of the one sealing panel, and a fairing.

8. The front part of an aircraft fuselage according to claim 1, wherein each of the frames situated at the stowage compartment has a part in a shape of an arc of a circle over more than 180°, and each end of the part in the shape of an arc of a circle is extended by a bracket, a first branch of the bracket bearing one sealing panel and a second branch of the bracket bearing the corresponding longitudinal side wall of the one sealing panel.

9. The aircraft, wherein the aircraft comprises the front fuselage part according to claim 1.

10. The front part of an aircraft fuselage according to claim 1, wherein each panel is fastened to the corresponding longitudinal side wall at a position above a pick-up axis of a landing gear that is stowable in the stowage compartment.

* * * * *